(12) United States Patent
Imamura et al.

(10) Patent No.: US 11,472,165 B2
(45) Date of Patent: Oct. 18, 2022

(54) PLATE-LIKE COMPOSITE MATERIAL

(71) Applicant: NITTO DENKO CORPORATION, Ibaraki (JP)

(72) Inventors: Shunji Imamura, Ibaraki (JP); Shimpei Yakuwa, Ibaraki (JP); Kou Uemura, Ibaraki (JP); Tomoyuki Kasagi, Ibaraki (JP); Yuya Kitagawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/263,695

(22) PCT Filed: Jul. 31, 2019

(86) PCT No.: PCT/JP2019/029936
§ 371 (c)(1),
(2) Date: Jan. 27, 2021

(87) PCT Pub. No.: WO2020/027172
PCT Pub. Date: Feb. 6, 2020

(65) Prior Publication Data
US 2021/0221106 A1    Jul. 22, 2021

(30) Foreign Application Priority Data

Jul. 31, 2018   (JP) .............................. JP2018-143498

(51) Int. Cl.
*B32B 27/06*    (2006.01)
*B32B 5/18*    (2006.01)
(Continued)

(52) U.S. Cl.
CPC .............. *B32B 27/065* (2013.01); *B32B 5/18* (2013.01); *B32B 27/20* (2013.01); *B32B 27/322* (2013.01);
(Continued)

(58) Field of Classification Search
CPC ......... B32B 27/065; B32B 5/18; B32B 27/20; B32B 27/322; B32B 2457/00; C08J 5/12;
(Continued)

(56) References Cited

U.S. PATENT DOCUMENTS 4,568,529 A * 2/1986 Leconte .................. C08L 23/12
427/221
4,798,762 A * 1/1989 Okada ..................... B32B 27/12
428/313.9
(Continued)

FOREIGN PATENT DOCUMENTS

| CN | 108136736 A | 6/2018 |
| JP | 4-59176 U | 5/1922 |

(Continued)

OTHER PUBLICATIONS

WO-2017159816—A1 translation (Year: 2017).*

(Continued)

*Primary Examiner* — Travis M Figg
(74) *Attorney, Agent, or Firm* — WHDA, LLP (57) ABSTRACT

A plate-like composite material in which peeling of a conductor layer and the like serving as wiring is less liable to occur is provided. The plate-like composite material includes: a pore-containing layer, which contains a fluororesin and a filler, and which contains pores; and a resin layer containing a fluororesin bonded to one surface, or each of both surfaces, of the pore-containing layer, wherein the pore-containing layer includes, in a vicinity of an interface with the resin layer, a high resin content region, which contains the fluororesin in a content higher than a content in a remaining region of the pore-containing layer, and which contains the pores in a content lower than a content in the (Continued)

remaining region, and wherein the high resin content region has a thickness starting from the interface of from 0.20 μm to 10 μm.

4 Claims, 3 Drawing Sheets

(51) Int. Cl.
*B32B 27/20* (2006.01)
*B32B 27/32* (2006.01)
*C08J 5/12* (2006.01)
*C08J 5/18* (2006.01)
*H01Q 1/36* (2006.01)
*H01Q 9/04* (2006.01)

(52) U.S. Cl.
CPC . *C08J 5/12* (2013.01); *C08J 5/18* (2013.01); B32B 2457/00 (2013.01); *C08J 2327/18* (2013.01); *H01Q 1/36* (2013.01); *H01Q 9/0407* (2013.01)

(58) Field of Classification Search
CPC ........... C08J 5/18; C08J 2327/18; H01Q 1/36; H01Q 9/0407
See application file for complete search history.

(56) References Cited

U.S. PATENT DOCUMENTS

| | | | | |
|---|---|---|---|---|
| 4,849,284 A | * | 7/1989 | Arthur | C08K 9/06 428/405 |
| 5,354,611 A | * | 10/1994 | Arthur | C08K 7/28 264/211 |
| 5,536,579 A | * | 7/1996 | Davis | H01L 23/5384 428/209 |
| 5,591,285 A | * | 1/1997 | Afzali-Ardakani | H05K 1/0373 264/105 |
| 2012/0231323 A1 | * | 9/2012 | Takagi | H01M 50/417 428/220 |
| 2013/0236793 A1 | * | 9/2013 | Takagi | H01M 50/489 429/251 |
| 2015/0015120 A1 | * | 1/2015 | Kaimori | H01L 41/45 428/314.2 |
| 2019/0074104 A1 | | 3/2019 | Kasagi et al. | |
| 2020/0079931 A1 | | 3/2020 | Yakuwa et al. | |

FOREIGN PATENT DOCUMENTS

| | | | | |
|---|---|---|---|---|
| JP | 3-212987 A | | 9/1991 | |
| JP | 5-136559 A | | 6/1993 | |
| JP | 6-119810 A | | 4/1994 | |
| JP | 2017-171833 A | | 9/2017 | |
| JP | 2017171833 A | * | 9/2017 | |
| JP | 6610375 B2 | * | 11/2019 | |
| WO | 2013/118598 A1 | | 8/2013 | |
| WO | 2017/159816 A1 | | 9/2017 | |
| WO | WO-2017159816 A1 | * | 9/2017 | ............... H05K 1/03 |
| WO | 2018/221556 A1 | | 12/2018 | |

OTHER PUBLICATIONS

JP-2017171833—A translation (Year: 2017).*
International Search Report dated Oct. 21, 2019, issued in counterpart International Application No. PCT/JP2019/029936, with English Translation. (4 pages).
Notification of Transmittal of Translation of the International Preliminary Report on Patentability (Form PCT/IB/338) issued in counterpart International Application No. PCT/JP2019/029936 dated Feb. 11, 2021 with Forms PCT/IB/373 and PCT/ISA/237. (8 pages).
Office Action dated May 9, 2022, issued in counterpart CN Application No. 201980050501.1, with its English machine translation. (16 pages).

* cited by examiner

PLATE-LIKE COMPOSITE MATERIAL

TECHNICAL FIELD

The present disclosure relates to a plate-like composite material suitable for a substrate of a microstrip patch antenna or the like to be used as a millimeter-wave radar or the like.

BACKGROUND ART

In recent years, in the automobile industry, research and development on advanced driver-assistance systems (ADAS) and automatic driving have been actively conducted, and the importance of a millimeter-wave radar as a sensing technology supporting the ADAS and automatic driving has also been growing. As the millimeter-wave radar for automobiles, the use of a "microstrip patch antenna" that is a planar antenna in which an antenna element (patch) or the like is printed and wired on a resin substrate is promising from the viewpoints of a small size, high performance, and low cost. Accordingly, the design of an antenna pattern and a substrate material have been investigated in order to achieve high performance.

As the substrate material to be used for those antennae, polytetrafluoroethylene (PTFE) having a small loss tangent is one of the promising materials. Further, in order to improve mechanical properties, thermal properties, and electrical properties, it has been proposed to blend a granular filler, such as boron nitride, silicon dioxide (silica), or titanium oxide (titania), or a filler such as a glass fiber or a carbon fiber (see PTLs 1 and 2).

RELATED ART DOCUMENTS

Patent Documents

PTL 1: JP-A-HEI03(1991)-212987
PTL 2: JP-A-HEI06(1994)-119810

SUMMARY

In a printed wiring board, so-called "wiring peeling" may occur. In the case of a substrate in which a fluororesin is used as a base material (matrix) and a large amount of a filler is blended, in particular, there is a problem in that it is difficult to secure the adhesive strength with wiring and the like. In addition, a resin layer may be formed between the wiring and the substrate in order to increase the adhesive strength. However, even in such case, peeling may occur, for example, between the substrate and the resin layer.

The present disclosure provides a plate-like composite material in which peeling of a conductor layer and the like serving as wiring is less liable to occur.

The inventors have made extensive investigations in order to solve the above-mentioned problem, and as a result, have found that a plate-like composite material satisfying specific conditions is less liable to cause peeling of a conductor layer and the like.

Specifically, the present disclosure is as described below.
<1> A plate-like composite material, including: a pore-containing layer, which contains a fluororesin and a filler, and which contains pores; and a resin layer containing a fluororesin bonded to one surface, or each of both surfaces, of the pore-containing layer, wherein the pore-containing layer includes, in a vicinity of an interface with the resin layer, a high resin content region, which contains the fluororesin in a content higher than a content in a remaining region of the pore-containing layer, and which contains the pores in a content lower than a content in the remaining region, and wherein the high resin content region has a thickness starting from the interface of from 0.20 μm to 10 μm.
<2> The composite material according to Item <1>, wherein the resin layer has a thickness of from 0.050 μm to 30 μm.
<3> The composite material according to Item <1> or <2>, wherein the pore-containing layer including the high resin content region has a thickness starting from the interface of from 2 μm to 3,000 μm.
<4> The composite material according to any one of Items <1> to <3>, further including a conductor layer bonded to the resin layer, wherein a maximum height Rz of a contact surface of the conductor layer with respect to the resin layer is from 0.020 μm to 10 μm.

According to the present disclosure, the plate-like composite material in which peeling of a conductor layer and the like serving as wiring is less liable to occur can be provided.

DESCRIPTION OF EMBODIMENTS

The present disclosure is described by way of specific examples. However, the present disclosure is not limited to the following contents and may be carried out with appropriate modifications without departing the spirit thereof.

<Plate-Like Composite Material>

A composite material according to one embodiment of the present disclosure (hereinafter sometimes abbreviated as "composite material") is a plate-like composite material including: a pore-containing layer, which contains a fluororesin and a filler, and which contains pores (hereinafter sometimes abbreviated as "pore-containing layer"); and a resin layer containing a fluororesin bonded to one surface, or each of both surfaces, of the pore-containing layer (hereinafter sometimes abbreviated as "resin layer"), wherein the pore-containing layer includes, in a vicinity of an interface with the resin layer, a high resin content region, which contains the fluororesin in a content higher than a content in a remaining region of the pore-containing layer, and which contains the pores in a content lower than a content in the remaining region (hereinafter sometimes abbreviated as "high resin content region"), and wherein the high resin content region has a thickness starting from the interface of from 200 nm (0.20 μm) to 10 μm.

As described above, in a substrate in which a fluororesin is used as a base material, and a large amount of a filler is blended, it is difficult to secure the adhesive strength with wiring and the like. In addition, even when a resin layer is formed between the wiring and the substrate in order to increase the adhesive strength, peeling may occur, for example, between the substrate and the resin layer. The inventors have found that, when the resin layer is bonded to the pore-containing layer, and in this state, the above-mentioned high resin content region is formed in the pore-containing layer, peeling of the resin layer and a conductor layer and the like bonded to the resin layer can be effectively suppressed. While the pores are effective for lowering the dielectric constant of the composite material, the pores cause a reduction in adhesive strength with the resin layer and the like. The inventors have revealed that, when a fluororesin is appropriately filled into each of the pores to form the high resin content region, and the thickness thereof is sufficiently secured, a plate-like composite material that is less liable to cause peeling is obtained.

The "thickness of the high resin content region" means the length of the high resin content region in a lamination direction of the pore-containing layer and the resin layer, and the length starts from the interface between the pore-containing layer and the resin layer to extend to a point at which the high resin content region is ended.

Now, a method of determining the "thickness of the high resin content region" is described in detail.

The "pore-containing layer", the "resin layer", the "high resin content region", the "interface" between the pore-containing layer and the resin layer, the "thickness of the high resin content region" starting from the interface, and the like in the present disclosure are identified through observation of a cross-section (cross-section cutting across each of the pore-containing layer and the resin layer) with a scanning electron microscope (hereinafter sometimes abbreviated as "SEM"). The "high resin content region" is a region in which the content of the fluororesin is higher than that in the remaining region of the pore-containing layer, and the content of the pores is lower than that in the remaining region of the pore-containing layer. The "high resin content region" is identified through observation of a cross-section with the SEM. Accordingly, the "content of the fluororesin" and the "content of the pores" each mean a numerical value based on a volume, and the volume is determined based on the area of a cross-section correlated thereto.

In addition, the "thickness of the high resin content region" is determined through SEM photographing and image processing according to the following procedures (1) to (5).

(1) SEM Photographing

Figure 2:
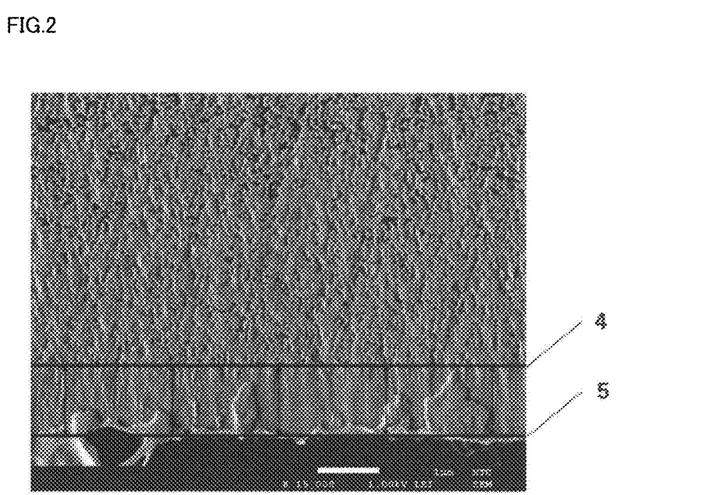
FIG. 2 is an image of a cross-section of the composite material photographed with a scanning electron microscope (SEM) (photograph serving as an alternative to a drawing).

Observation of a cross-section with the SEM is performed at a magnification within a range of from 10,000 to 20,000, and photographing is performed so as to include the pore-containing layer, the resin layer, and the interface between the pore-containing layer and the resin layer. For example, FIG. 2 is an image acquired through SEM photographing. In general, a pore portion in a cross-section of the pore-containing layer becomes concave and is reflected as a dark portion. In contrast, a filler portion becomes convex or flat and is reflected as a bright portion. In addition, the cross-section of the resin layer has a uniform composition, and hence is reflected as a smooth surface. Accordingly, the pore-containing layer, the resin layer, and the interface between the pore-containing layer and the resin layer can be clearly distinguished. It is preferred that the photographing be performed so that the interface between the pore-containing layer and the resin layer is horizontal (parallel to the lateral direction of the image) because the image processing operation described later becomes easy. In addition, in the case of a composite material including a conductor layer (for example, a metal layer), the photographing may be performed under a state in which the conductor layer is included. However, it is preferred that the photographing be performed after the conductor layer is removed because it becomes easy to determine the thickness of the high resin content region.

(2) Importing of Photographed SEM Image into Image Processing Software

The acquired SEM image is imported into software capable of performing binarization, and trimming involving cutting out an excessively bright region or an excessively dark region is performed, to thereby process the SEM image into a square grayscale image. The cutting out is performed so that each of the pore-containing layer, the resin layer, and the interface between the pore-containing layer and the resin layer remains.

(3) Setting of Threshold Value and Binarization

Information on a frequency distribution of lightness (density histogram) of the acquired grayscale image is checked. Then, the grayscale image is converted into a binarized image by setting a position of a "20% value of (maximum value-minimum value)" from the "minimum value" of pixel values as a threshold value.

(4) Division of Binarized Image and Calculation of Area Values of Black Portions The binarized image is divided in a vertical direction (direction perpendicular to the interface between the pore-containing layer and the resin layer) (cutting is performed in a horizontal direction) so that a length in the vertical direction is from 50 nm to 200 nm, and area values of black portions in each of the divided images are calculated. The features of the images are clearly different between the pore-containing layer and the resin layer, and hence it is preferred that the division be performed so that the pore-containing layer and the resin layer are separated from each other exactly at the position of the interface between the pore-containing layer and the resin layer.

(5) Plotting of Area Values of Black Portions and Determination of Thickness of High Resin Content Region A graph for showing a distribution of areas of black portions is created by plotting the position (distance) in the vertical direction from the interface between the pore-containing layer and the resin layer to the pore-containing layer side as an x-value and plotting the area values of the black portions as a y-value. In the obtained graph, there is observed a region in which, when the x-value increases, the y-value starts increasing from a certain point, and when the x-value further increases, the y-value starts fluctuating to be saturated (hereinafter sometimes abbreviated as "saturated region"). The high resin content region is determined to be from the point at which the y-value starts increasing to the y-value corresponding to 20% of an average value of the y-value in the saturated region, and the thickness of the high resin content region is defined as a difference between the x-value of the point at which the y-value starts increasing and the x-value of the 20% point of the average value of the y-value in the saturated region (see FIG. 6). In this case, when the resin layer and the pore-containing layer (including the high resin content region) fall within one field of view, the areas of the pores after the pore-containing layer are saturated. However, when the areas of the pores are not saturated, the image is moved by one field of view in the Y-axis direction at the same magnification, and an SEM photographed image is acquired, with the result that the areas of the pores can be continuously measured.

The thickness of the high resin content region starting from the interface is from 0.20 µm to 10 µm, preferably 0.40 µm or more, more preferably 0.60 µm or more, still more preferably 1.0 µm or more, most preferably 2.0 µm or more, and preferably 8.0 µm or less, more preferably 6.0 µm or less, still more preferably 4.0 µm or less, particularly preferably 3.0 µm or less, most preferably 2.5 µm or less. When the thickness falls within the above-mentioned ranges, peeling of the conductor layer and the like can be effectively suppressed, and a satisfactory specific dielectric constant and the like as a composite material can be secured.

Now, the contents of the "pore-containing layer", the "resin layer", and the "high resin content region" are described in detail.

(Pore-Containing Layer)

The pore-containing layer is a layer containing a fluororesin and a filler, and containing pores, and the "fluororesin" means a polymer compound obtained through polymerization of an olefin containing a fluorine atom.

Examples of the fluororesin include polytetrafluoroethylene (PTFE), a perfluoroalkoxyalkane (PEA), a tetrafluoroethylene-hexafluoropropylene copolymer (FEP), polychlorotrifluoroethylene (PCTEF), a tetrafluoroethylene-ethylene copolymer (ETFE), a chlorotrifluoroethylene-ethylene copolymer (ECTFE), and polyvinylidene fluoride (PVDF). Those resins may be used alone or in combination thereof. Of those, PTFE is particularly preferred.

The fluororesin in the pore-containing layer is preferably "fibrillated". Fibrils in the fibrillated fluororesin are more preferably oriented not only in one direction but also in a plurality of directions, and the fibrils and inorganic fine particle aggregates to be described later are particularly preferably linked to each other to form a "three-dimensional fine network structure" as shown in the image taken with a SEM shown in FIG. 2. When the fluororesin is fibrillated, in particular, forms the three-dimensional fine network structure, the composite material can secure an excellent mechanical strength and excellent dimensional stability. The fibrillation or the like of the fluororesin may be confirmed through the observation of its surface with a SEM or the like. In addition, it is preferred that the fibrillation of the fluororesin, which may be advanced by, for example, applying a shear force, be more specifically performed through multi-stage rolling to be described later. In addition, the formation of the three-dimensional fine network structure is preferably performed through directionally different multi-stage rolling to be described later.

The pore-containing layer is a layer containing a fluororesin and a filler, and containing pores, and examples of the filler include a granular filler and a fibrous filler. Examples of the granular filler include: solid carbon, such as carbon black; silicon dioxide (silica), such as porous silica, molten silica, or silica gel; an oxide (including a composite oxide) of a transition metal, such as titanium oxide (e.g., titanium dioxide (titania)), iron oxide, or zirconium oxide (e.g., zirconium dioxide (zirconia)); and a nitride of a typical element, such as boron nitride or silicon nitride. In addition, examples of the fibrous filler include a glass fiber and a carbon fiber. Those fillers may be used alone or in combination thereof.

It is preferred that the pore-containing layer contain, as the filler, "porous inorganic fine particle aggregates (hereinafter sometimes abbreviated as "inorganic fine particle aggregates") each formed by aggregation of inorganic fine particles having an average primary particle diameter of from 5 nm to 200 nm." When the pore-containing layer contains the inorganic fine particle aggregates as the filler, properties, such as a satisfactory specific dielectric constant and a satisfactory thermal expansion coefficient, can be secured. Each of the inorganic fine particle aggregates is specifically such an aggregate as shown in an image taken with a SEN shown in FIG. 3, and means an aggregate that is formed by the fusion of a plurality of inorganic fine particles, and that has voids between the inorganic fine particles and is hence porous.

Now, the "inorganic fine particle aggregates" are described in detail.

Examples of a material for the inorganic fine particles in the inorganic fine particle aggregates include: an oxide (including a composite oxide) of a typical element, such as silicon oxide (e.g., silicon monoxide or silicon dioxide (silica)) or aluminum oxide (alumina); an oxide (including a composite oxide) of a transition metal, such as titanium oxide (e.g., titanium dioxide (titania)), iron oxide, or zirconium oxide (e.g., zirconium dioxide (zirconia)); and a nitride of a typical element, such as boron nitride or silicon nitride. Those materials may be used alone or in combination thereof. Of those, an oxide of a typical element is preferred, and silicon dioxide (silica) is particularly preferred. The oxide of a typical element can suppress the specific dielectric constant of the composite material to an extremely low level, and enables the production of the composite material at lower cost. Although the crystallinity of the inorganic fine particles is not particularly limited, when silicon dioxide is used, the inorganic fine particles are typically amorphous.

The average primary particle diameter of the inorganic fine particles, which is from 5 nm to 200 nm, is preferably 10 nm or more, more preferably 15 nm or more, still more preferably 20 nm or more, and is preferably 150 nm or less, more preferably 120 nm or less, still more preferably 100 nm or less, particularly preferably 80 nm or less, most preferably 70 nm or less. In the case where the average primary particle diameter falls within the above-mentioned ranges, the inorganic fine particle aggregates are hardly broken even when subjected to treatment such as mixing, forming, or rolling, and hence satisfactory voids can be secured between the inorganic fine particles. In addition, the plate-like composite material easily secures a smooth surface. The average primary particle diameter of the inorganic fine particles is a numerical value obtained by: measuring the diameters of the particles through their observation with a SEM; and averaging the measured values. The average primary particle diameter is specifically a numerical value obtained as follows: the inorganic fine particles (100 fine particles) are randomly selected, and their respective particle diameters (the lengths of the long sides of the particles) are measured, followed by the averaging of the particle diameters serving as the measured values.

The average particle diameter of the primary aggregate products of the inorganic fine particles is typically 100 nm or more, preferably 120 nm or more, more preferably 150 nm or more, and is typically 400 nm or less, preferably 380 nm or less, more preferably 350 nm or less.

The average particle diameter of the secondary aggregate products (aggregate products of the primary aggregate products) of the inorganic fine particles is typically 0.2 µm or more, preferably 1 µm or more, more preferably 2 µm or more, and is typically 100 µm or less, preferably 90 µm or less, more preferably 80 µm or less.

The inorganic fine particle aggregates in the composite material are each preferably in a state of a secondary aggregate product. When the aggregates are each in a state of a secondary aggregate product, the three-dimensional fine network structure is easily formed.

In addition, the average particle diameter of the primary aggregate products of the inorganic fine particles and the average particle diameter of the secondary aggregate products of the inorganic fine particles may each be calculated by the same method as that for the average primary particle diameter of the inorganic fine particles described in the foregoing.

The BET specific surface area of the inorganic fine particle aggregates is typically 10 $m^2/g$ or more, preferably 20 $m^2/g$ or more, more preferably 30 $m^2/g$ or more, still more preferably 40 $m^2/g$ or more, and is typically 250 $m^2/g$ or less, preferably 240 $m^2/g$ or less, more preferably 210 $m^2/g$ or less, still more preferably 150 $m^2/g$ or less, particularly preferably 80 $m^2/g$ or less. When the BET specific surface area falls within the above-mentioned ranges, the composite material can secure a high porosity, and an increase in loss tangent thereof can be suppressed. In particular, when the BET specific surface area is excessively high, the loss tangent of the composite material tends to increase. The BET specific surface area of the inorganic fine particle aggregates is a numerical value calculated by substituting, for example, a gas adsorption amount measured by a gas adsorption method (in particular, a nitrogen adsorption isotherm) into a BET equation, and is represented by a numerical value before the use of the aggregates in the production of the composite material.

The apparent specific gravity of the inorganic fine particle aggregates is typically 10 g/L or more, preferably 20 g/L or more, more preferably 30 g/L or more, still more preferably 40 g/L or more, and is typically 100 g/L or less, preferably 90 g/L or less, more preferably 80 g/L or less, still more preferably 70 g/L or less, particularly preferably 60 g/L or less. When the apparent specific gravity falls within the above-mentioned ranges, the composite material can secure a high porosity, and the inorganic fine particle aggregates are hardly broken. The apparent specific gravity of the inorganic fine particle aggregates is a numerical value obtained by: loading the inorganic fine particle aggregates into a container that can measure a volume, such as a 250-milliliter measuring cylinder; measuring the loaded mass (X g) and loaded volume (Y mL) of the inorganic fine particle aggregates; and dividing the loaded mass by the loaded volume ([apparent specific gravity (g/L)]=X/Y×1000")

Examples of the inorganic fine particle aggregates include MIZUKASIL series (manufactured by Mizusawa Industrial Chemicals, Ltd.), SILYSIA series (manufactured by Fuji Silysia Chemical Ltd.), hydrophobic AEROSIL series (manufactured by Nippon Aerosil Co., Ltd.), and Nipsil series (manufactured by Tosoh Silica Corporation). Of those, hydrophobic fumed silica of hydrophobic AEROSIL series (manufactured by Nippon Aerosil Co., Ltd.) is particularly preferred.

The content of the inorganic fine particle aggregates in the filler is typically 60 mass % or more, preferably 70 mass % or more, more preferably 80 mass % or more, still more preferably 90 mass % or more, particularly preferably 100 mass %.

The content of the filler in a region other than the high resin content region of the pore-containing layer is typically 30 parts by mass or more, preferably 40 parts by mass or more, more preferably 45 parts by mass or more, still more preferably 50 parts by mass or more, particularly preferably 55 parts by mass or more with respect to 100 parts by mass of the total of the fluororesin and the filler, and is typically 85 parts by mass or less, preferably 80 parts by mass or less, more preferably 75 parts by mass or less, still more preferably 70 parts by mass or less, particularly preferably 65 parts by mass or less with respect thereto. When the content falls within the above-mentioned ranges, the composite material can secure properties such as a satisfactory specific dielectric constant and a satisfactory expansion coefficient.

Although the pore-containing layer may contain a substance other than the fluororesin and filler described in the foregoing, the total content of the fluororesin and the filler in the pore-containing layer is typically 60 mass % or more, preferably 70 mass % or more, more preferably 80 mass % or more, still more preferably 90 mass % or more, particularly preferably 100 mass %.

It is preferred that the surface of the filler (including the inorganic fine particle aggregates) be modified with a surface modifier having a hydrophobic group (hereinafter sometimes abbreviated as "surface modifier").

Now, the modification with the "surface modifier" is described in detail.

Examples of the hydrophobic group of the surf ace modifier include a fluoro group (—F) and a hydrocarbon group (—$C_nH_{2n+1}$ (n=1 to 30)). Of those, a fluoro group that exhibits a liquid-repelling property not only on water but also on an oil agent is particularly preferred.

The surface modifier may be a surface modifier that chemically adsorbs (reacts) to the surface of the filler, or may be a surface modifier that physically adsorbs to the surface of the filler, and may be a low-molecular weight compound, or may be a polymer compound. The surface modifier that chemically adsorbs (reacts) to the surface of the filler typically has a reactive functional group that reacts with a surface functional group (e.g., a hydroxyl group (—OH)) of the filler, and examples of the reactive functional group include an alkoxysilyl group (—SiOR, where the number of carbon atoms of R is from 1 to 6), a chlorosilyl group (—SiCl), a bromosilyl group (—SiBr), and a hydrosilyl group (—SiH). A known method may be appropriately adopted as a method of modifying the surface of the filler with the surface modifier, and is, for example, a method involving bringing the filler and the surface modifier into contact with each other.

The number of kinds of the surface modifiers is not limited to one, and two or more kinds of the surface modifiers may be used. For example, after a surface modifier that is a low-molecular weight compound having a reactive functional group has been caused to react with the surface of the filler, a surface modifier that is a polymer compound having a hydrophobic group may be caused to physically adsorb onto the resultant. In the case where a material for the filler is silicon dioxide (silica) or the like, the filler may be dissolved (decomposed) when exposed to a basic aqueous solution. However, when the filler is modified as described above, its resistance to the basic aqueous solution can be improved.

The thermal decomposition temperature of the surface modifier is typically 250° C. or more, preferably 300° C. or more, more preferably 350° C. or more, still more preferably 360° C. or more, particularly preferably 370° C. or more. In the case where the thermal decomposition temperature falls within the above-mentioned ranges, the surface modifier can be suppressed from decomposing even when subjected to treatment such as high-temperature heating. The thermal decomposition temperature of the surface modifier is defined as the temperature at which the weight of the surface modifier reduces by 5% when its temperature is increased by a thermogravimeter-differential thermal analysis method (TG-DTA) at 20° C./min.

Examples of a surface modifier that is a low-molecular weight compound having a fluoro group and a reactive functional group include compounds represented by the following formulae. The compounds represented by the following formulae are commercially available, and may each be appropriately obtained and utilized as a surface modifier.

Examples of a surface modifier that is a polymer compound having a fluoro group include compounds represented by the following formulae.

In the formulae, "n" and "m" each represent a positive number.

A solution commercially available as a surface modifier may be utilized, and a suitable example thereof is NOVEC (trademark) 2202 manufactured by 3M Company. It has been announced that the NOVEC (trademark) 2202 contains a polymer compound having a fluoro group and is blended with a "fluoroalkylsilane polymer". The use of the NOVEC (trademark) 2202 as a surface modifier has an advantage in that the critical liquid-repellent tension of the composite material is easily suppressed to a low level by a relatively simple operation.

The content of the surface modifier (organic matter content) in the filler is typically 0.1 mass % or more, preferably 1 mass % or more, more preferably 2 mass % or more, still more preferably 3 mass % or more, particularly preferably 4 mass % or more, and is typically 50 mass % or less, preferably 40 mass % or less, more preferably 30 mass % or less, still more preferably 25 mass % or less, particularly preferably 20 mass % or less.

The thickness of the region other than the high resin content region of the pore-containing layer is typically from 19.6 μm to 2,999.6 μm, preferably 23.6 μm or more, more preferably 28.6 μm or more, still more preferably 31.6 μm or more, most preferably 33.6 μm or more, and preferably 2,899.6 μm or less, more preferably 2,799.6 μm or less, still more preferably 2,699.6 μm or less, particularly preferably 2,599.6 μm or less, most preferably 2,499.6 μm or less. When the thickness falls within the above-mentioned ranges, a satisfactory specific dielectric constant and the like as a composite material can be secured.

The thickness of the pore-containing layer (including the high resin content region) starting from the interface is typically from 2 μm to 3,000 μm, preferably 20 μm or more, more preferably 24 μm or more, still more preferably 28 μm or more, particularly preferably 32 μm or more, most preferably 34 μm or more, and preferably 2,900 μm or less, more preferably 2,800 μm or less, still more preferably 2,700 μm or less, particularly preferably 2,600 μm or less, most preferably 2,500 μm or less. When the thickness falls within the above-mentioned ranges, peeling of the conductor layer and the like can be effectively suppressed, and a satisfactory specific dielectric constant and the like as a composite material can be secured.

The pore-containing layer is a layer containing a fluororesin and a filler, and containing pores, and the size of each of the pores in the region other than the high resin content region of the pore-containing layer is, as the maximum diameter of the black portions in the binarized image, typically 0.020 μm or more, preferably 0.030 μm or more, more preferably 0.040 μm or more, still more preferably 0.045 μm or more, most preferably 0.050 μm or more, and typically 1.5 μm or more, preferably 1.0 μm or less, more preferably 0.90 μm or less, still more preferably 0.80 μm or less, particularly preferably 0.70 μm or less, most preferably 0.60 μm or less. When the size falls within the above-mentioned ranges, peeling of the conductor layer and the like can be effectively suppressed, and a satisfactory specific dielectric constant and the like as a composite material can be secured.

The porosity of a material forming the pore-containing layer is typically 30% or more, preferably 35% or more, more preferably 40% or more, still more preferably 45% or more, particularly preferably 50% or more, and is typically 80% or less, preferably 70% or less. When the porosity falls within the above-mentioned ranges, properties, such as a satisfactory specific dielectric constant and a satisfactory expansion coefficient, as a composite material can be secured. The porosity is a numerical value calculated by measuring the bulk density of the material forming the pore-containing layer and the true density of the material forming the pore-containing layer and substituting the measured values into the following equation.

Porosity [%]=(1−(bulk density [g/cm³] of material forming pore-containing layer/true density [g/cm³] of material forming pore-containing layer))×100

The pore-containing layer is a layer containing a fluororesin and a filler, and containing pores, but the pore-containing layer may contain components other than the fluororesin, the filler, and the pores. Specifically, there is given an example in which the pore-containing layer contains a reinforcing material for enhancing strength and dimensional stability. As a material for the reinforcing material, those used as a reinforcing material for a substrate may be appropriately adopted, and there are given, for example, a glass cloth and a resin cloth. The position of the reinforcing material in the pore-containing layer is not particularly limited, and the reinforcing material is generally arranged in an intermediate portion in a thickness direction of the pore-containing layer.

(Resin Layer)

The resin layer is a layer containing a fluororesin bonded to one surface, or each of both surfaces, of the pore-containing layer, and the "fluororesin" means a polymer compound (preferred melting point: from 100° C. to 400° C.) obtained through polymerization of an olefin containing a fluorine atom as described above.

Examples of the fluororesin include polytetrafluoroethylene (PTFE, melting point: 327° C.), a perfluoroalkoxyalkane (PFA, melting point: 310° C.), a tetrafluoroethylene-hexafluoropropylene copolymer (FEP, melting point: 260° C.), polychlorotrifluoroethylene (PCTEF, melting point: 220° C.), a tetrafluoroethylene-ethylene copolymer (ETFE, melting point: 270° C.), a chlorotrifluoroethylene-ethylene copolymer (ECTFE, melting point: 270° C.), and polyvinylidene fluoride (PVDF, melting point: 151° C. to 178° C.). Of those, PTFE and PFA are particularly preferred.

Although the resin layer may contain a substance other than the fluororesin, the content of the fluororesin in the resin layer is typically 60 mass % or more, preferably 70 mass % or more, more preferably 80 mass % or more, still more preferably 90 mass % or more, particularly preferably 100 mass %.

The thickness of the resin layer is typically from 0.050 μm to 30 μm, preferably from 0.100 μm or more, more preferably 0.40 μm or more, still more preferably 1.0 μm or more, most preferably 1.5 μm or more, and preferably 20 μm or less, more preferably 10 μm or less, still more preferably 8.0 μm or less, particularly preferably 6.0 μm or less, most preferably 5.0 μm or less. When the composite material is used as an electronic circuit board, the composite material is exposed to various chemicals to be used in, for example, a production process for an electronic circuit. For example, when the composite material is exposed to a treatment liquid having high permeability, the treatment liquid may permeate the inside of the composite material to cause an appearance failure or changes in properties of the board. The resin layer also serves to suppress the permeation of the treatment liquid. Accordingly, when the thickness of the resin layer falls within the above-mentioned ranges, peeling of the conductor layer and the like can be effectively suppressed, and the appearance failure or changes in properties are less liable to occur even when the composite material is exposed to the treatment liquid having high permeability and the like to be used in production of an electronic circuit board. The thickness of the resin layer means a numerical value obtained by measuring a distance from an end in the thickness direction of the resin layer to the interface between the pore-containing layer and the resin layer at about five to about ten points and averaging the measured distances.

The porosity of the composite material (pore-containing layer+resin layer) is typically 30% or more, preferably 35% or more, more preferably 40% or more, still more preferably 45% or more, particularly preferably 50% or more, and is typically 80% or less, preferably 70% or less. When the porosity falls within the above-mentioned ranges, properties, such as a satisfactory specific dielectric constant and a satisfactory expansion coefficient, as a composite material can be secured. The porosity is a numerical value calculated by measuring the bulk density of the composite material and the true density of the composite material and substituting the measured values into the following equation.

Porosity [%]=(1−(bulk density [g/cm³] of composite material/true density [g/cm³] of composite material))×100

The resin layer may be bonded to both surfaces of the pore-containing layer instead of being bonded to only one surface thereof. When the resin layer is bonded to both surfaces of the pore-containing layer, it is preferred that the high resin content region be included in the vicinity of the interface with each of both the resin layers.

The composite material is of a plate shape, and the thickness of the composite material is typically 2 μm or more, preferably 10 μm or more, more preferably 20 μm or more, still more preferably 50 μm or more, particularly preferably 80 μm or more, and is typically 2,000 μm or less, preferably 1,000 μm or less, more preferably 500 μm or less, still more preferably 200 μm or less, particularly preferably 150 μm or less.

The composite material may have another layer bonded thereto with the resin layer interposed therebetween. As the other layer, there is given a conductor layer, and the conductor layer is generally a metal layer.

In general, examples of metallic species of the metal layer when the layer is used as a wiring include gold (Au), silver (Ag), platinum (Pt), copper (Cu), aluminum (Al), and alloys containing these metallic species.

The thickness of the metal layer when the layer is used as a wiring is typically 5 μm or more, preferably 10 μm or more, more preferably 15 μm or more, and is typically 50 μm or less, preferably 45 Tim or less, more preferably 40 μm or less.

A maximum height Rz of a contact surface of the conductor layer with respect to the resin layer is typically 0.020 μm or more, preferably 0.050 μm or more, more preferably 0.10 μm or more, still more preferably 0.20 μm or more, particularly preferably 0.30 μm or more, and is typically 10 μm or less, preferably 8.0 μm or less, more preferably 6.0 μm or less, still more preferably 4.0 μm or less, particularly preferably 2.0 μm or less. The "maximum height Rz" means a numerical value determined based on JIS B0601:2013 of Japan Industrial Standards (Japan Industrial Standards created without changing the technical contents of ISO 4287, which is a standard of the International Organization for Standardization).

In addition, the "maximum height Rz of the contact surface of the conductor layer with respect to the resin layer" may be directly measured, or the maximum height Rz of a material to be used for the conductor layer may be directly used.

The relationship between the thickness of the resin layer and the maximum height Rz of the conductor layer ((thickness of resin layer)−(maximum height Rz of conductor layer)) is typically 0.005 μm or more, preferably 0.010 μm or more, more preferably 0.050 μm or more, still more preferably 0.10 μm or more, particularly preferably 0.50 μm or more, and is typically 29.98 μm or less, preferably 20 μm or less, more preferably 15 μm or less, further preferably 10 μm or less, particularly preferably 5.0 μm or less. When the relationship falls within the above-mentioned ranges, the thickness of the resin layer is sufficiently ensured. Accordingly, the appearance failure or changes in properties are less liable to occur even when the composite material is exposed to the treatment liquid having high permeability and the like to be used in production of an electronic circuit board.

The specific dielectric constant (frequency: 10 GHz) of the composite material is typically 2.5 or less, preferably 2.3 or less, more preferably 2.2 or less, still more preferably 2.1 or less, particularly preferably 2.0 or less, and is typically 1.55 or more. The specific dielectric constant of the composite material is the numerical value of a real part ($\varepsilon r'$) calculated by measuring a complex dielectric constant in accordance with a cavity resonator perturbation method (measurement frequency: 10 GHz).

The loss tangent (frequency: 10 GHz) of the composite material is typically 0.01 or less, preferably 0.0075 or less, more preferably 0.005 or less, still more preferably 0.004 or less, particularly preferably 0.003 or less, and is typically 0.0005 or more. The loss tangent of the composite material is the ratio ($\varepsilon r''/\varepsilon r'$) of an imaginary part ($\varepsilon r''$) to the real part ($\varepsilon r'$) calculated by measuring the complex dielectric constant in accordance with the cavity resonator perturbation method (measurement frequency: 10 GHz).

The linear thermal expansion coefficient of the composite material is typically 70 ppm/K or less, preferably 60 ppm/K or less, more preferably 55 ppm/K or less, still more preferably 50 ppm/K or less, particularly preferably 45 ppm/K or less, and is typically 10 ppm/K or more. The linear thermal expansion efficient of the composite material is the numerical value of an average linear thermal expansion coefficient in the range of from −50° C. to 200° C. obtained by a thermal mechanical analysis (TMA) method. Specifically, the composite material having a width of 4 mm and a length of 20 mm is fixed in its lengthwise direction, and a load of 2 g is applied thereto. The temperature of the material is increased from room temperature (25° C.) to 200° C. at a rate of temperature increase of 10° C./min, and is held at 200° C. for 30 minutes so that the residual stress of the material may be removed. Next, the temperature is cooled to −50° C. at 10° C./min, and is held at −50° C. for 15 minutes. After that, the temperature is increased to 200° C. at 2° C./min. An average linear thermal expansion coefficient in the range of from −50° C. to 200° C. in the second temperature increase process was defined as the linear thermal expansion coefficient.

Usage of Composite Material

The usage of the composite material is not particularly limited, but preferably includes an electronic circuit board, more preferably a circuit board of a mobile phone, a computer, or the like, a substrate of a microstrip patch antenna for a millimeter-wave radar, and the like.

Method of Producing Composite Material

The composite material is a plate-like material in which the resin layer is bonded to one surface, or each of both surfaces, of the pore-containing layer, but a method of producing the composite material is not particularly limited, and the composite material may be produced by appropriately adopting a known finding. A method of producing the composite material including the following resin-preparing step, filler-preparing step, mixing step, forming step, rolling step, and resin layer-forming step (hereinafter sometimes abbreviated as "method of producing the composite material") is particularly preferred:

a resin-preparing step of preparing a fluororesin (hereinafter sometimes abbreviated as "resin-preparing step");
a filler-preparing step of preparing a filler (hereinafter sometimes abbreviated as "filler-preparing step");

a mixing step of mixing the fluororesin, the filler, and a volatile additive to provide a precursor composition (hereinafter sometimes abbreviated as "mixing step").

a forming step of forming the precursor composition to provide a product to be rolled that can be rolled (hereinafter sometimes abbreviated as "forming step");

a rolling step of rolling the product to be rolled to provide a rolled product (hereinafter sometimes abbreviated as "rolling step"); and a resin layer-forming step of forming a resin layer containing a fluororesin on one surface, or each of both surfaces, of the rolled product to provide a composite material (hereinafter sometimes abbreviated as "resin layer-forming step").

Now, the "resin-preparing step", the "filler-preparing step", the "mixing step", the "forming step", the "rolling step", the "resin layer-forming step", and the like are described in detail.

The resin-preparing step is a step of preparing a fluororesin, and the fluororesin may be obtained or produced for oneself. The average particle diameter (median diameter d50) of a granulated product of a fluororesin to be prepared (particles after secondary particles) is typically 0.5 μm or more, preferably 1.0 μm or more, more preferably 10 μm or more, still more preferably 30 μm or more, and is typically 700 μm or less, preferably 300 μm or less, more preferably 150 μm or less, still more preferably 100 μm or less, particularly preferably 50 μm or less. When the average particle diameter falls within the above-mentioned ranges, the resin and the filler are easily dispersed uniformly. The average particle diameter of the granulated product of a fluororesin may be determined by a method based on JIS Z8825:2001 of Japan Industrial Standards.

The filler-preparing step is a step of preparing a filler, and the filler (including inorganic fine particle aggregates) may be obtained or produced for oneself. The average particle diameter (median diameter d50) of a granulated product of a filler to be prepared (particles after secondary particles) is typically 0.1 μm or more, preferably 0.5 μm or more, more preferably 1 μm or more, still more preferably 3 μm or more, and is typically 500 μm or less, preferably 200 μm or less, more preferably 100 μm or less, still more preferably 50 μm or less, particularly preferably 20 μm or less. When the average particle diameter falls within the above-mentioned ranges, the resin and the filler are easily dispersed uniformly. The average particle diameter of the granulated product of a filler may be determined by a method based on JIS Z8825:2001 of Japan Industrial Standards.

In addition, it is preferred that the surface of the filler be modified with the above-mentioned surface modifier.

The mixing step is a step of mixing the fluororesin, the filler, and a volatile additive to provide a precursor composition, and the mixing may be performed by appropriately adopting a known method, such as a dry method or a wet method, a mixer, and the like.

The rotation speed (peripheral speed) of a stirrer or the like in the case of the dry method is typically 0.5 m/sec or more, preferably 1 m/sec or more, more preferably 5 m/sec or more, still more preferably 10 m/sec or more, particularly preferably 15 m/sec or more, and is typically 200 m/sec or less, preferably 180 m/sec or less, more preferably 140 m/sec or less, still more preferably 100 m/sec or less, particularly preferably 50 msec or less, most preferably 20 m/sec or less. When the rotation speed falls within the above-mentioned ranges, the resin and the filler are easily dispersed uniformly.

The mixing time in the case of the dry method is typically 10 seconds or more, preferably 20 seconds or more, more preferably 30 seconds or more, still more preferably 40 seconds or more, particularly preferably 1 minute or more, most preferably 5 minutes or more, and is typically 60 minutes or less, preferably 50 minutes or less, more preferably 40 minutes or less, still more preferably 30 minutes or less, particularly preferably 20 minutes or less, most preferably 15 minutes or less. When the mixing time falls within the above-mentioned ranges, the resin and the filler are easily dispersed uniformly.

The rotation speed (peripheral speed) of a stirrer or the like in the case of the wet method is typically 1 m/sec or more, preferably 5 m/sec or more, more preferably 10 m/sec or more, still more preferably 15 m/sec or more, particularly preferably 20 m/sec or more, most preferably 25 m/sec or more, and is typically 160 m/sec or less, preferably 130 m/sec or less, more preferably 100 m/sec or less, still more preferably 80 m/sec or less, particularly preferably 60 m/sec or less, most preferably 40 m/sec or less. When the rotation speed falls within the above-mentioned ranges, the resin and the filler are easily dispersed uniformly.

The mixing time in the case of the wet method is typically 5 seconds or more, preferably 10 seconds or more, more preferably 20 seconds or more, still more preferably 30 seconds or more, particularly preferably 40 seconds or more, most preferably 50 seconds or more, and is typically 60 minutes or less, preferably 50 minutes or less, more preferably 40 minutes or less, still more preferably 20 minutes or less, particularly preferably 10 minutes or less, most preferably 5 minutes or less. When the mixing time falls within the above-mentioned ranges, the resin and the filler are easily dispersed uniformly.

The volatile additive serves to sufficiently contain the pores in the pore-containing layer by being finally volatilized to be removed. The volatile additive means a compound that has a boiling point of from 30° C. to 300° C. and is a liquid at room temperature, and the boiling point of the volatile additive is preferably 50° C. or more, more preferably 100° C. or more, still more preferably 200° C. or more, and is preferably 280° C. or less, more preferably 260° C. or less, still more preferably 240° C. or less.

Examples of the kind of the volatile additive include a hydrocarbon, an ether, and an ester each having low reactivity, and an aliphatic saturated hydrocarbon is preferred. Specific examples thereof include hexane (boiling point: 69° C.), heptane (boiling point: 98° C.), octane (boiling point: 126° C.), nonane (boiling point: 151° C.), decane (boiling point: 174° C.), undecane (boiling point: 196° C.), dodecane (boiling point: 215° C.), tridecane (boiling point: 234° C.), and tetradecane (boiling point: 254° C.), and dodecane is particularly preferred. Those additives may be used alone or in combination thereof.

The addition amount of the volatile additive is typically 1 part by mass or more, preferably 5 parts by mass or more, more preferably 10 parts by mass or more, still more preferably 20 parts by mass or more, particularly preferably 30 parts by mass or more with respect to 100 parts by mass of the total of the fluororesin and the filler, and is typically 200 parts by mass or less, preferably 150 parts by mass or less, more preferably 130 parts by mass or less, still more preferably 110 parts by mass or less, particularly preferably 100 parts by mass or less with respect thereto. When the addition amount falls within the above-mentioned ranges, the composite material can secure a satisfactory porosity.

In the mixing step, in addition to the fluororesin, the filler, and the volatile additive, a solvent other than the volatile additive is preferably added before the mixing. The solvent has an action of bringing the precursor composition into a paste state to enable its uniform dispersion. Examples of the solvent include water and lower alcohols, such as methanol, ethanol, isopropanol, and butanol.

The forming step is a step of forming the precursor composition to provide a product to be rolled that can be rolled, and a forming machine to be used in the forming step is, for example, an FT die, a press machine, an extrusion molding machine, or a calender roll. Of those, an FT die is particularly preferred.

The rolling step is a step of rolling the product to be rolled to provide a rolled product. The step is preferably "multi-stage rolling" in which the following operation is repeated a plurality of times: the resultant rolled products are laminated, and the laminate is rolled as a product to be rolled. The step is particularly preferably "directionally different multi-stage rolling" in which the product to be rolled is rolled in a direction different from the previous rolling direction. The directionally different multi-stage rolling is, for example, the repetition of the following operation: a product to be rolled is obtained by laminating rolled products so that the rolled products may face the same rolling direction, and the product to be rolled is rolled in a rolling direction rotated from the previous rolling direction by 90°.

The number of the rolled products to be laminated in the multi-stage rolling is typically 2 or more, preferably 3 or more, more preferably 4 or more, still more preferably 10 or more, particularly preferably 30 or more, and is typically 2,000 or less, preferably 1,000 or less, more preferably 500 or less, still more preferably 200 or less, particularly preferably 100 or less.

The rolling ratio in the rolling step is typically 10 or more, preferably 20 or more, more preferably 40 or more, still more preferably 50 or more, particularly preferably 100 or more, and is typically 20,000 or less, preferably 10,000 or less, more preferably 5,000 or less, still more preferably 2,000 or less, particularly preferably 1,000 or less.

An apparatus to be used in the rolling step is, for example, a press machine, an extrusion molding machine, or a rolling roll (e.g., a calender roll).

The resin layer-forming step is a step of forming a resin layer containing a fluororesin on one surface, or each of both surfaces, of the rolled product to provide a composite material. As a method of forming the resin layer, there is given a method involving heating and pressurizing a resin film containing a fluororesin with a press machine or the like to bond the resin film to the rolled product. By heating and pressurizing the resin film containing a fluororesin, the fluororesin permeates the pores of the pore-containing layer, and a satisfactory high resin content region is formed, with the result that peeling of the conductor layer and the like can be effectively suppressed, and a satisfactory specific dielectric constant and the like as a composite material can be secured.

The thickness of the resin film containing a fluororesin is typically 0.050 μm or more, preferably 0.10 μm or more, more preferably 0.40 μm or more, still more preferably 1.0 μm or more, particularly preferably 1.5 μm or more, and is typically 30 μm or less, preferably 20 μm or less, more preferably 10 μm or less, still more preferably 8.0 μm or less, particularly preferably 6.0 μm or less, most preferably 5.0 μm or less.

The pressure in the resin layer-forming step is typically 0.01 MPa or more, preferably 0.10 MPa or more, more preferably 0.50 MPa or more, still more preferably 0.80 MPa or more, particularly preferably 1.00 MPa or more, and is typically 50 MPa or less, preferably 40 MPa or less, more preferably 30 MPa or less, still more preferably 20 MPa or less, particularly preferably 10 MPa or less. When the pressure falls within the above-mentioned ranges, the thickness of the high resin content region easily falls within preferred ranges, with the result that peeling of the conductor layer and the like can be effectively suppressed, and a satisfactory specific dielectric constant and the like as a composite material can be secured.

The temperature in the resin layer-forming step is typically 250° C. or more, preferably 280° C. or more, more preferably 300° C. or more, still more preferably 320° C. or more, particularly preferably 340° C. or more, and is typically 500° C. or less, preferably 480° C. or less, more preferably 460° C. or less, still more preferably 440° C. or less, particularly preferably 420° C. or less. When the temperature falls within the above-mentioned ranges, the thickness of the high resin content region easily falls within preferred ranges, with the result that peeling of the conductor layer and the like can be effectively suppressed, and a satisfactory specific dielectric constant and the like as a composite material can be secured.

The heating and pressurization time in the resin layer-forming step is typically 1 second or more, preferably 30 seconds or more, more preferably 1 minute or more, still more preferably 2 minutes or more, particularly preferably 3 minutes or more, and is typically 180 minutes or less, preferably 120 minutes or less, more preferably 60 minutes or less, still more preferably 30 minutes or less, particularly preferably 20 minutes or less. When the heating and pressurization time falls within the above-mentioned ranges, the thickness of the high resin content region easily falls within preferred ranges, with the result that peeling of the conductor layer and the like can be effectively suppressed, and a satisfactory specific dielectric constant and the like as a composite material can be secured.

As an apparatus to be used in the resin layer-forming step, there are given a press machine, a hot roll laminating machine, a belt press machine, and the like.

The method of producing the composite material may include any other step, and specific examples thereof include the following steps:

an additive-removing step of removing the volatile additive from the rolled product (hereinafter sometimes abbreviated as "additive-removing step");

an other layer-forming step of forming a conductor layer on one surface, or each of both surfaces, of the composite material (hereinafter sometimes abbreviated as "conductor layer-forming step"); and a patterning step of subjecting the conductor layer to patterning treatment (hereinafter sometimes abbreviated as "patterning step").

The "additive-removing step", the "conductor layer-forming step", the "patterning step", and the like are described in detail below.

The additive-removing step is a step of removing the volatile additive from the rolled product, and a method therefor is typically, for example, a method involving heating the rolled product in a heating furnace that may be used in drying. A heating condition may be appropriately selected in accordance with, for example, the boiling point of the volatile additive.

The conductor layer-forming step is a step of forming a conductor layer on one surface, or each of both surfaces, of the composite material, and a method of forming the conductor layer is, for example, sputtering, plating, the pressure bonding of a metal foil, or a lamination method.

The patterning step is a step of subjecting the metal layer to patterning treatment, and a method for the patterning treatment is, for example, an additive method involving using a photoresist or the like, or a subtractive method based on etching.

EXAMPLES

The present disclosure is described below more specifically by way of Examples, and appropriate modifications may be made without departing from the spirit of the present disclosure. Accordingly, the scope of the present disclosure should not be construed as being limited by the specific examples described below.

Example 1

Hydrophobic fumed silica (manufactured by Nippon Aerosil Co., Ltd., product number: "NY50", BET specific surface area: 30 m$^2$/g, apparent specific gravity: 60 g/L, average particle diameter of primary particles: 30 nm) serving as a filler, and polytetrafluoroethylene (PTFE: manufactured by Daikin Industries, Ltd., product number: "Polyflon PTFE F-104", average particle diameter: 550 μm) serving as a fluororesin were prepared. The hydrophobic fumed silica and the PTFE were mixed in a ratio of 60:40 (mass ratio) in consideration of a solid content. Dodecane serving as a volatile additive was added to the mixture in an amount of 40 mass % (with respect to the total amount), and the resultant was mixed with a V-type mixer (rotation number: 10 rpm, temperature: 24° C., time: 5 minutes). The obtained paste was passed through a pair of rolling rolls to obtain an elliptical base sheet (sheet-like formed body) having a thickness of 3 mm, a width of from 10 mm to 50 mm, and a length of 150 mm. A plurality of the base sheets were produced.

Two of the base sheets were superposed on one another while rolling directions thereof were aligned with each other. The base sheets were rotated from the previous rolling direction by 90° while sheet surfaces thereof were kept parallel to each other, followed by rolling, to thereby produce a second rolled laminated sheet. A plurality of second rolled laminated sheets were produced. Further, two of the second rolled laminated sheets were superposed on one another to be laminated, to thereby produce a third rolled laminated sheet. Thus, the step of laminating and rolling the sheets was repeated a total of five times counted from the lamination and rolling of the base sheets, and then the resultant was rolled a plurality of times while a gap between the rolling rolls was narrowed by 0.5 mm each time, with the result that a rolled laminated sheet having a thickness of about 160 μm was obtained (number of layers forming the sheet: 32). Next, the volatile additive was removed by heating the resultant rolled laminated sheet at 150° C. for 20 minutes, to thereby produce a pore-containing sheet serving as a pore-containing layer.

Next, Fluon (trademark) PTFE dispersion AD939E (manufactured by AGC Inc., solid content: 60 mass %) was applied to one surface of a polyimide carrier by dip coating so that a WET thickness (thickness of a coating film in an undried state) became 4 μm, and the resultant was heated at 150° C. for 5 minutes and at 380° C. for 5 minutes to produce a resin film serving as a resin layer. A Cu foil (manufactured by JX Nippon Mining & Metals Corporation, product number: "BHFX-HS-92F", thickness: 18 μm, maximum height Rz: 0.75 μm) serving as a conductor layer was prepared, and the resin layer film and the Cu foil were laminated and pressurized with a press machine at a pressure of 6 MPa and a temperature of 360° C. for 10 minutes to produce a resin conductor sheet. The resin conductor sheet and the above-mentioned pore-containing sheet were laminated, and the resultant was subjected to pressure forming at 360° C. for 10 minutes at 6 MPa to obtain a composite material of Example 1. Finally, the total thickness of the layers other than the conductor layer was about 130 μm.

Example 2

A pore-containing sheet produced by the same method as that in Example 1, a 12.5 μm Neoflon PFA film (manufactured by Daikin Industries, Ltd., material: PFA) serving as a resin film, and a Cu foil (manufactured by JX Nippon Mining & Metals Corporation, product number: "BHFX-HS-92F", thickness: 18 μm, maximum height Rz: 0.75 μm) serving as a conductor layer were laminated, and the resultant was subjected to pressure forming at 360° C. for 10 minutes at 6 MPa to obtain a composite material of Example 2.

Example 3

A composite material was obtained by the same method as that in Example 1 except that Fluon (trademark) PTFE dispersion AD939E was changed so as to have a WET thickness of 2 μm.

Example 4

Neoflon PFA AD-2CRER (manufactured by Daikin Industries, Ltd., material: PFA, solid content: 50 mass %) was applied to one surface of a Cu foil (JX Nippon Mining & Metals Corporation, product number: "BHFX-HS-92F", thickness: 18 μm, maximum height Rz: 0.75 μm) serving as a conductor layer by spray coating so that a WET thickness became 4 μm, and the resultant was heated at 150° C. for 5 minutes to produce a resin conductor sheet. Dodecane was added to a mixture produced by the same method as that in Example 1 in an amount of 55 mass % (with respect to the total amount), and the resultant was mixed with a V-type mixer (rotation number: 10 rpm, temperature: 24° C., time: 5 minutes). The obtained paste was formed into a sheet by the same method as that in Example 1. The obtained pore-containing sheet and the resin conductor sheet were laminated, and the resultant was subjected to pressure forming at 360° C. for 10 minutes at 6 MPa to obtain a composite material of Example 4.

Example 5

A rolled laminated sheet having a final thickness of 125 μm was obtained by the same method as that in Example 1 except that the rolling was performed under a condition that the gap between the rolls at the time of final rolling was changed to 0.13 mm. The obtained rolled laminated sheet was heated at 150° C. for 20 minutes to remove the volatile additive, to thereby produce a pore-containing sheet serving as a pore-containing layer. An ETFE sheet (manufactured by Daikin Industries, Ltd., Neoflon ETFE film, thickness: 25 μm) was laminated between a Cu foil (JX Nippon Mining & Metals Corporation, product number: "BHFX-HS-92F", thickness: 18 μm, maximum height Rz: 0.75 μm) serving as a conductor layer and the pore-containing sheet, and the resultant was subjected to pressure forming at 360° C. for 10 minutes at 6 MPa to obtain a composite material of Example

Example 6

A rolled laminated sheet having a final thickness of 48 μm was obtained by the same method as that in Example 1 except that the rolling was performed under a condition that the gap between the rolls at the time of final rolling was changed to 0.08 mm. The obtained rolled laminated sheet was heated at 150° C. for 20 minutes to remove the volatile additive, to thereby produce a pore-containing sheet serving as a pore-containing layer. The obtained pore-containing sheet was laminated with a resin conductor sheet produced by the same method as that in Example 1, and the resultant was subjected to pressure forming at 360° C. for 10 minutes at 6 MPa to obtain a composite material of Example 6. Finally, the total thickness of the layers other than the conductor layer was about 40 μm.

Example 7

A rolled laminated sheet having a final thickness of 3,140 μm was obtained by the same method as that in Example 1 except that the rolling was performed under a condition that the gap between the rolls at the time of final rolling was changed to 2.5 mm. The obtained rolled laminated sheet was heated at 150° C. for 20 minutes to remove the volatile additive, to thereby produce a pore-containing sheet serving as a pore-containing layer. The obtained pore-containing sheet was laminated with a resin conductor sheet produced by the same method as that in Example 1, and the resultant was subjected to pressure forming at 360° C. for 10 minutes at 6 MPa to obtain a composite material of Example 7. Finally, the total thickness of the layers other than the conductor layer was about 2,512 μm.

Comparative Example 1

A composite material was obtained by the same method as that in Example 1 except that Fluon (trademark) PTFE dispersion AD939E was changed so as to have a WET thickness of 7 μm, and further, the laminate of the resin conductor sheet and the pore-containing sheet was subjected to pressure forming at 320° C. for 10 minutes at 6 MPa.

Measurement of Bulk Density of Pore-Containing Sheet

Ten samples each measuring 10 mm×10 mm were cut out equally longitudinally and laterally from a plane measuring 305 mm×457 mm of the pore-containing sheet obtained by removing the volatile additive of each of Examples 1 to 7 and Comparative Example 1, and dimensions in width and length directions were measured through use of a projector (manufactured by Mitutoyo Corporation, model number: "PJ-H30", set magnification: 10 times). An end portion of the evaluation sample can be easily determined through measurement by a transmission method. The thickness of the evaluation sample was measured through use of a dial gauge (manufactured by Mitutoyo Corporation, 543 series ABS Solar-type Digimatic Indicator ID-SS), and the mass of each of the ten evaluation samples was measured through use of an electronic balance (manufactured by Shimadzu Corporation, AUW220D, measurement environment temperature: 25° C., minimum display unit: 0.001 mg). Then, the bulk density was calculated by substituting the measured values into the following equation.

Bulk density [g/cm$^3$] of pore-containing sheet=mass [g] of sample/(surface area [cm$^3$] of sample× thickness [cm])

Measurement of Porosity of Pore-Containing Sheet

Each of the evaluation samples evaluated in the above-mentioned "Measurement of Bulk Density of Pore-containing Sheet" was increased in temperature to 900° C. with TG-DTA (manufactured by Bruker Corporation, 2000SA) in a nitrogen atmosphere at a temperature increase rate of 2° C./min, and the reduction in mass was evaluated. By substituting the reduction in mass as the mass of the resin and the mass of the remaining components as the mass of the filler into the following equation, the content of the filler was calculated. Calculation was performed through use of the density of the filler (fumed silica) of 2.2 [g/cm$^3$] and the density of the resin (PTFE) of 2.1 [g/cm$^3$].

Content of filler [mass %]=(mass [g] of remaining components/initial mass [g])×100

Content of resin [mass %]=(mass [g] of reduction in mass/initial mass [g])×100

True density [g/cm$^3$] of pore-containing sheet=mass % of filler×density of filler [g/cm$^3$]+mass % of resin×density of resin [g/cm$^3$]

The porosity was calculated from the bulk density of the evaluation sample obtained in the above-mentioned "Measurement of Bulk Density of Pore-containing Sheet" and the calculated true density.

Porosity [%]=(1−(bulk density [g/cm$^3$] of pore-containing sheet/true density [g/cm$^3$] of pore-containing sheet))×100

Breakdown Mode (Test of Copper-Clad Laminate for Printed Wiring Board

Each of the composite materials of Examples 1 to 7 and Comparative Example 1 was subjected to a test of a copper-clad laminate for a printed wiring board based on JIS C6481:1996 of Japan Industrial Standards. A test piece having a length of about 100 mm was produced under a state in which a conductor layer (Cu layer) was laminated in a width of 10 mm, and the conductor layer portion was peeled off in a direction of 90° at a speed of 50 mm/min. The cross-section of the conductor layer after being peeled off was cut to about 10 μm by microtome processing. Then, cross-section processing of about 1 μm was performed through use of an ion polish (IP) method. As a result of cross-section observation by a field emission scanning electron microscope (FE-SEM), the case in which the resin layer did not adhere to the conductor layer was determined to be "interface failure", the case in which the pore-containing layer of 1 μm or more adhered to the resin layer adhering to the conductor layer was determined to be "cohesive failure", and the case in which the pore-containing layer of less than 1 μm adhered to the resin layer adhering to the conductor layer was determined to be "failure between resin layer/pore-containing layer". The results are shown in Table 1.

Measurement of Methanol Permeation Amount

Figure 1:
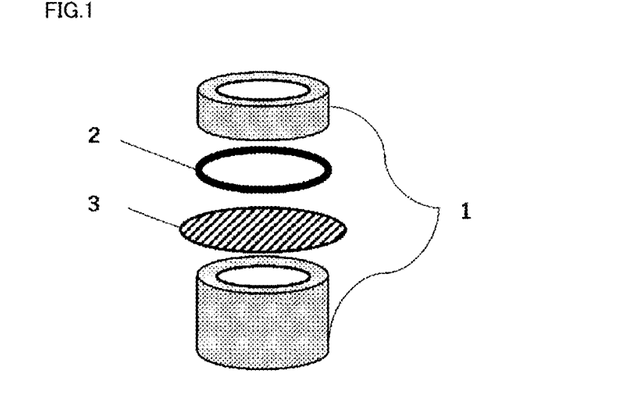
FIG. 1 is a conceptual perspective view of a jig used in methanol permeation amount measurement of a composite material.

Each of the composite materials of Examples 1 to 7 and Comparative Example 1 was etched with a ferric chloride solution at 40° C. to remove the conductor layer. The obtained composite material was punched out to a diameter φ of 44, and dried at 150° C. for 1 hour. After that, the mass was measured to be defined as an initial mass. In order to prevent permeation of methanol from a side surface of the composite material, a jig illustrated in FIG. 1 was used. Specifically, a composite material 3 having the conductor layer removed therefrom was packed from above and below with an O-ring fixing container 1 through use of an O-ring 2 having a diameter p of 40, and methanol was dropped from the center portion of the O-ring 2 in the same amount as the mass of the composite material 3. After the resultant was kept at room temperature for 3 minutes, methanol was wiped out, and the mass of the composite material 3 was measured. In this case, the methanol permeation amount was defined as (composite material after being immersed in methanol-initial mass)/initial mass. The results are shown in Table 1.

Thickness of Resin Layer

In order to measure the thickness of the resin layer of each of the composite materials of Examples 1 to 7 and Comparative Example 1, each of the composite materials was etched with a ferric chloride solution at 40° C. to remove the conductor layer. The obtained composite material was cut to about 10 μm by microtome processing, and then subjected to cross-section processing of about 1 μm through use of an ion polish (IP) method.

The distance from the surface of the resin layer in one field of view to the interface between the resin layer and the pore-containing layer was measured at a magnification of 15,000 times at five points through use of a field emission scanning electron microscope (FE-SEM), and an average value thereof was defined as the thickness of the resin layer. The pore-containing layer and the resin layer can be easily determined from an SEM photographed image based on whether or not the filler is present.

Thickness of High Resin Content Region

Figure 3:
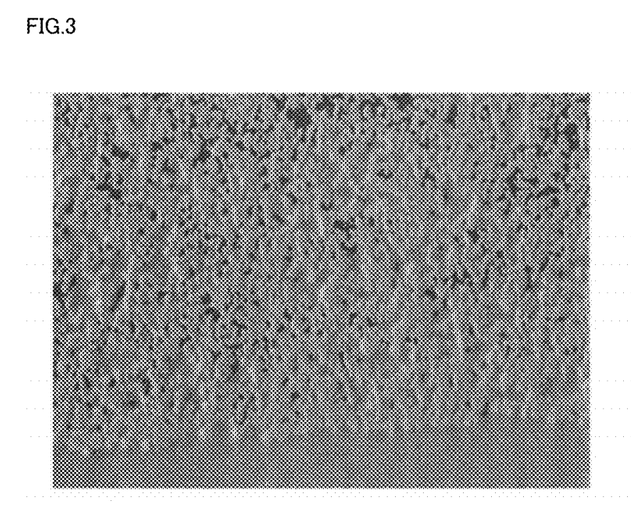
FIG. 3 is an image of the cross-section of the composite material after image information portions, such as a magnification and a scale, are trimmed (photograph serving as an alternative to a drawing).

The same cross-section processing as in the thickness of the resin layer was performed, and an SEM photographed image was acquired by an FE-SEM at a magnification of 15,000 times so that the resin layer and the pore-containing layer (including the high resin content region) were included in one field of view. The SEM photographed image is shown in FIG. 2. The photographing was performed so that the interface between the pore-containing layer and the resin layer was parallel in a lateral direction of the image, and the resin layer appeared on a lower side. That is, reference numeral 4 in FIG. 2 denotes the interface between the pore-containing layer and the resin layer, and reference numeral 5 denotes the surface of the resin layer. The SEM photographed image was processed by trimming image information portions, such as a magnification and a scale, included in the SEM photographed image so that only the image remained. The image of the cross-section of the composite material after trimming is shown in FIG. 3.

Figure 4:
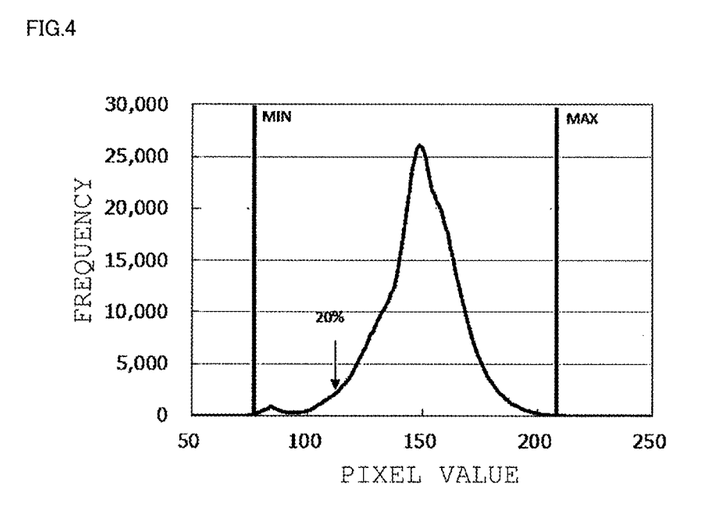
FIG. 4 is a density histogram of an 8-bit grayscale image of the cross-section of the composite material.
Figure 5:
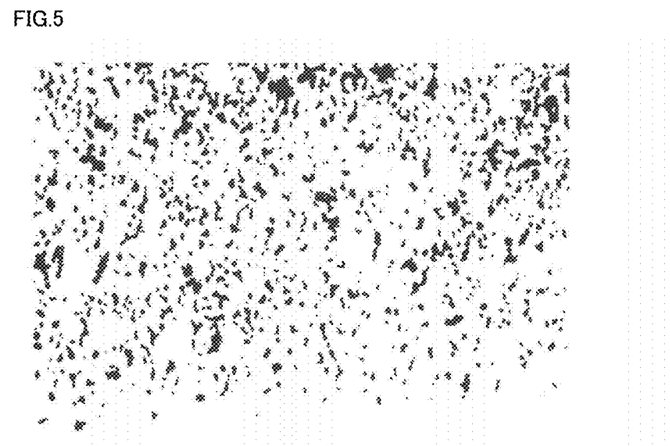
FIG. 5 is a binarized image of the cross-sect ion of the composite material (photograph serving as an alternative to a drawing).

The SEM photographed image was imported into image processing software. A density histogram thereof was acquired as an 8-bit grayscale image, and a threshold value for performing binarization was determined. The density histogram is shown in FIG. 4. The threshold value was set to a position of a "20% value of (maximum value-minimum value)" from the "minimum value" of obtained pixel values, and the 8-bit grayscale image was converted into a binarized image. The resin layer and the filler portion each had a low pixel value and became white, and the pore portions each had a high pixel value and became black. The binarized image is shown in FIG. 5. In FIG. 5, the vicinity of the interface between the pore-containing layer and the resin layer is mostly white, and black portions increase toward an upper side of the image. Accordingly, it is understood from FIG. 5 that the content of the pores in the high resin content region of the pore-containing layer is low.

Figure 6:
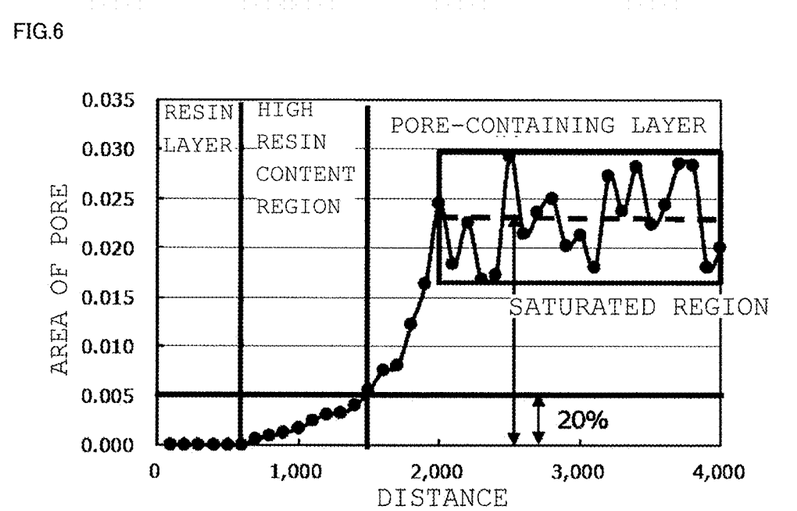
FIG. 6 is a graph obtained by plotting the distance from a bottom side of an image on an x-axis and plotting the areas of pores (black portions) on a y-axis.

Threshold value=(maximum pixel value-minimum pixel value)×20%+minimum pixel value The obtained binarized image was cut in the horizontal direction every 100 nm in the vertical direction, and the binarized image was processed into a plurality of strip-like images. The cutting of the image was determined so that the interface between the pore-containing layer and the resin layer was exactly cut. Next, a graph was created by calculating the areas of the pores (black portions) included in each of the strip-like images and plotting the calculated areas as the y-value, and plotting the distance of each of the strip-like images from a bottom side of the binarized image as the x-value. For example, it was assumed that no pores were present in the resin layer portion, and the area of 0 nm from the bottom side of the image became 0, and the areas of the pores in a first section, that is, the areas of the pores in a section of from 0 nm to 100 nm were defined as the areas of the pores at a time of 100 nm. A graph obtained by plotting the distance from the bottom side of the image on the x-axis and plotting the areas of the pores (black portions) on the v-axis is shown in FIG. 6.

In the obtained graph, there was observed a region in which, when the x-value increased, the y-value started increasing from a certain point, and when the x-value further increased, the v-value started fluctuating to be saturated (hereinafter sometimes abbreviated as "saturated region"). The high resin content region was determined to be from the point at which the y-value started increasing to the v-value corresponding to 20% of an average value of the y-value in the saturated region, and the thickness of the high resin content region was defined as a difference between the x-value of the point at which the y-value started increasing and the x-value of the 20% point of the average value of the y-value in the saturated region (see FIG. 6). The end portion of the resin layer means the distance at which the area becomes 0, and a region after the determined high resin content region was determined to be the pore-containing layer.

Thickness of Region Other than High Resin Content Region of Pore-Containing Layer The same cross-section processing as in the thickness of the resin layer was performed, and the distance from an upper surface to a lower surface of the pore-containing layer was measured at a magnification of 500 times at five points, and an average value thereof was defined as the thickness of the pore-containing layer. The thickness of the region other than the high resin content region of the pore-containing layer was calculated by subtracting the thickness of the high resin content region from the thickness of the pore-containing layer.

(Thickness of region other than high resin content region of pore-containing layer)=(thickness of pore-containing layer)−(thickness of high resin content region)

Measurement of Bulk Density of (Resin Layer+Pore-Containing Layer) Other than Conductor Layer In the above-mentioned "Thickness of Resin Layer", ten samples each measuring 10 mm×10 mm were cut out equally longitudinally and laterally from a plane measuring 305 mm×457 mm of the composite material having the conductor layer removed therefrom of each of Examples 1 to 7 and Comparative Example 1, and dimensions in width and length directions were measured through use of a projector (manufactured by Mitutoyo Corporation, model number: "PJ-H30", set magnification: 10 times). An end portion of the evaluation sample can be easily determined through measurement by a transmission method. The thickness of the evaluation sample was measured through use of a dial gauge (manufactured by Mitutoyo Corporation, 543 series ABS Solar-type Digimatic Indicator ID-SS), and the mass of each of the ten evaluation samples was measured through use of an electronic balance (manufactured by Shimadzu Corporation, AUW220D, measurement environment temperature: 25° C., minimum display unit: 0.001 mg). Then, the bulk density was calculated by substituting the measured values into the following equation.

Bulk density [g/cm$^3$] of (resin layer+pore-containing layer) other than conductor layer=mass [g] of sample/(surface area [cm$^3$] of sample×thickness [cm])

<Measurement of Porosity of (Resin Layer+Pore-Containing Layer) Other than Conductor Layer>

The evaluation sample evaluated in the above-mentioned "Measurement of Bulk Density of (Resin Layer+Pore-containing Layer) other than Conductor Layer" was increased in temperature to 900° C. with TG-DTA (manufactured by Bruker Corporation, 2000SA) in a nitrogen atmosphere at a temperature increase rate of 2° C./min, and the reduction in mass was evaluated. By substituting the reduction in mass at from 0° C. to 500° C. as the mass of the resin (ETFE), the reduction in mass at from more than 500° C. to less than 900° C. as the mass of the resins (PTFE, PFA), and the mass of the remaining components as the mass of the filler into the following equation, the content of the filler was calculated. Calculation was performed through use of the density of the filler (fumed silica) of 2.2 [g/cm$^3$] the density of the resins (PTFE, PFA) of 2.1 [g/cm$^3$], and the density of the resin (ETFE) of 1.7 [g/cm$^3$].

Content [mass %] of filler=(mass [g] of remaining components÷initial mass [g])×100

Content [mass %] of resin (ETFE)=(mass [g] corresponding to reduction in mass at from 0° C. to 500° C.÷initial mass [g])×100

Content [mass %] of resins (PTFE,PFA)=(mass [g] corresponding to reduction in mass at from more than 500° C. to 900° C.÷initial mass [g])×100

True density [g/cm$^3$] of pore-containing sheet=mass % of filler×density [g/cm$^3$] of filler+mass % of resins (PTFE,PFA)×density [g/cm$^3$] of resins (PTFE,PFA)+mass % of resin (ETFE)×density [g/cm$^3$] of resin (ETFE)

The porosity was calculated from the bulk density of the evaluation sample obtained in the above-mentioned "Measurement of Bulk Density of (Resin Layer+Pore-containing layer) other than Conductor Layer" and the calculated true density.

Porosity [%]=(1−(bulk density [g/cm$^3$] of (resin layer+pore-containing layer) other than conductor layer/true density [g/cm$^3$] of (resin layer+pore-containing layer) other than conductor layer))×100

TABLE 1

|  | Example 1 | Example 2 | Example 3 | Example 4 | Example 5 | Example 6 | Example 7 | Comparative Example 1 |
|---|---|---|---|---|---|---|---|---|
| Thickness of region other than high resin content region of pore-containing layer | 126 μm | 124 μm | 128 μm | 130 μm | 97 μm | 36 μm | 2,507 μm | 116 μm |
| Porosity of pore-containing sheet | 55.3% | 54.3% | 55.3% | 67.0% | 56.5% | 45.2% | 51.2% | 50.2% |
| Thickness of high resin content region | 0.90 μm | 9.4 μm | 0.57 μm | 2.23 μm | 1.24 μm | 0.82 μm | 0.86 μm | 0.15 μm |
| Kind of fluororesin in resin layer | PTFE (Melting point: 327° C.) | PFA (Melting point: 310° C.) | PTFE (Melting point: 327° C.) | PFA (Melting point: 310° C.) | ETFE (Melting point: 260° C. to 270° C.) | PTFE (Melting point: 327° C.) | PTFE (Melting point: 327° C.) | PTFE (Melting point: 327° C.) |
| Thickness of resin layer | 1.79 μm | 3.1 μm | 0.48 μm | 0 | 20.20 μm | 1.63 μm | 1.66 μm | 4.37 μm |
| Porosity of (resin layer + pore-containing layer) other than conductor layer | 42.9% | 36.1% | 43.4% | 50.3% | 31.6% | 41.4% | 45.3% | 41.9% |
| Maximum height Rz of conductor layer | 0.75 μm | 0.75 μm | 0.75 μm | 0.75 μm | 0.75 μm | 0.75 μm | 0.75 μm | 0.75 μm |

TABLE 1-continued

| | Example 1 | Example 2 | Example 3 | Example 4 | Example 5 | Example 6 | Example 7 | Comparative Example 1 |
|---|---|---|---|---|---|---|---|---|
| Methanol permeation amount | 0.80% | 0.10% | 21.30% | 25.90% | 0.52% | 0.2% | 0.45% | 0.70% |
| Breakdown mode (test of copper-clad laminate for printed wiring board) | Cohesive failure | Cohesive failure | Cohesive failure | Cohesive failure | Cohesive failure | Cohesive failure | Cohesive failure | Failure between resin layer/pore-containing layer |

Although specific modes of the present disclosure have been described in Examples above, Examples are for illustrative purposes only and are not to be construed as limitative. It is intended that various modifications apparent to a person skilled in the art fall within the scope of the present disclosure.

The composite material according to one embodiment of the present disclosure can be used as a circuit board of a mobile phone, a computer, or the like, a substrate of a microstrip patch antenna for a millimeter-wave radar, and the like.

REFERENCE SIGNS LIST

1 O-ring fixing container
2 O-ring
3 composite material having conductor layer removed therefrom
4 interface between pore-containing layer and resin layer
5 surface of resin layer

The invention claimed is:

1. A plate-like composite material, comprising:
   a pore-containing layer, containing a fluororesin and a filler, and containing pores; and
   a resin layer containing a fluororesin bonded to one surface, or each of both surfaces, of the pore-containing layer,
   wherein the pore-containing layer includes, in a vicinity of an interface with the resin layer, a high resin content region, containing the fluororesin in a content higher than a content in a remaining region of the pore-containing layer, and containing the pores in a content lower than a content in the remaining region, and
   wherein the high resin content region has a thickness starting from the interface of from 0.20 µm to 10 µm.

2. The composite material according to claim 1, wherein the resin layer has a thickness of from 0.050 µm to 30 µm.

3. The composite material according to claim 1, wherein the pore-containing layer including the high resin content region has a thickness starting from the interface of from 2 µm to 3,000 µm.

4. The composite material according to claim 1, further comprising a conductor layer bonded to the resin layer, wherein a maximum height Rz of a contact surface of the conductor layer with respect to the resin layer is from 0.020 µm to 10 µm.

* * * * *